United States Patent [19]

Hajjahmad et al.

[11] Patent Number: 5,748,770

[45] Date of Patent: May 5, 1998

[54] SYSTEM AND METHOD FOR COLOR RECOVERY USING DISCRETE COSINE TRANSFORMS

[75] Inventors: Ibrahim Hajjahmad, Malden; Michael L. Reisch, Carlisle; F. Richard Soini, Sudbury; Munib A. Wober, Haverhill, all of Mass.

[73] Assignee: Polaroid Corporation, Cambridge, Mass.

[21] Appl. No.: 441,000

[22] Filed: May 15, 1995

Related U.S. Application Data

[63] Continuation-in-part of Ser. No. 159,795, Nov. 30, 1993, abandoned.

[51] Int. Cl.[6] .......................... G06K 9/00; H04N 1/415
[52] U.S. Cl. .................... 382/167; 358/518; 358/432
[58] Field of Search .............................. 382/167, 254, 382/277, 278, 279, 280, 250; 348/268–281, 395–396, 403; 345/150, 152, 153; 358/518, 525, 432, 428; 364/577

[56] References Cited

U.S. PATENT DOCUMENTS

| | | | |
|---|---|---|---|
| 4,441,123 | 4/1984 | Ochi | 358/44 |
| 4,663,661 | 5/1987 | Weldy et al. | 348/242 |
| 4,709,259 | 11/1987 | Suzuki | 348/280 |
| 4,888,795 | 12/1989 | Ando et al. | 348/18 |
| 4,896,029 | 1/1990 | Chandler | 235/494 |
| 4,941,185 | 7/1990 | Reed | 372/267 |
| 4,967,264 | 10/1990 | Parulski | 358/44 |
| 4,998,010 | 3/1991 | Chandler | 235/494 |
| 5,079,621 | 1/1992 | Daly et al. | 348/396 |
| 5,121,445 | 6/1992 | Tsujiuchi et al. | 382/280 |
| 5,168,375 | 12/1992 | Reisch et al. | 358/432 |
| 5,245,416 | 9/1993 | Glenn | 358/44 |
| 5,396,441 | 3/1995 | Ozawa | 348/242 |
| 5,475,769 | 12/1995 | Wober et al. | 382/167 |
| 5,533,173 | 7/1996 | Wober et al. | 395/114 |
| 5,629,780 | 5/1997 | Watson | 358/432 |

FOREIGN PATENT DOCUMENTS

465250A2  1/1992  European Pat. Off. ........ G06F 15/72

OTHER PUBLICATIONS

Tsai, "Color Image Compression for Single–Chip Cameras" in IEEE Transactions on Electron Devices, vol. 38, No. 5, May 1991.

"Interpolation Using the Discrete Cosine Transform"; Agbinya, Electronics Letters 24 Sep. 1992, vol. 28, No. 20.

*Primary Examiner*—Leo Boudreau
*Assistant Examiner*—Bhavesh Mehta
*Attorney, Agent, or Firm*—Robert A. Sabourin

[57] ABSTRACT

Full color resolution of an image is realized by reconstructing an array of image data points from an image signal representing the image into a shifted array of pseudo pixels. The particular grid type of the array will dictate whether color recovery uses only vertical resolution, only horizontal resolution, vertical resolution followed by horizontal resolution, or horizontal resolution followed by vertical resolution. For each color channel, interpolation of missing color components is accomplished by first, taking a DCT of the image data points, then taking a modified IDCT of the DCT coefficients.

6 Claims, 16 Drawing Sheets

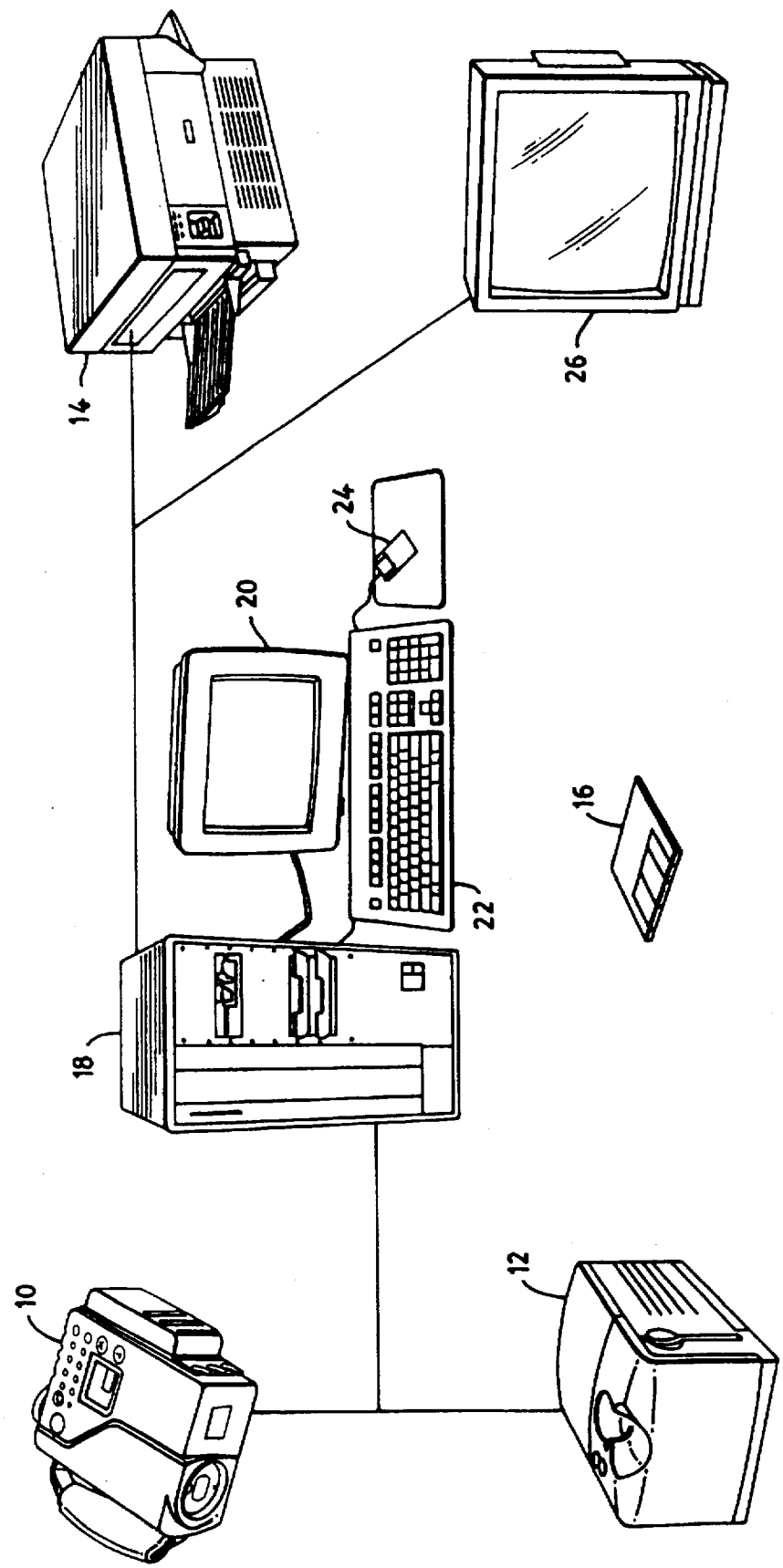

|   | 0 | 1 | 2 | 3 | 4 | 5 | 6 | 7 | 8 | - COL. # |
|---|---|---|---|---|---|---|---|---|---|---|
| 0 | r | g | b | r | g | b | r | g | b | |
| 1 | r | g | b | r | g | b | r | g | b | |
| 2 | r | g | b | r | g | b | r | g | b | |
| 3 | r | g | b | r | g | b | r | g | b | |

ROW #

FIG. 5

|   | 0 | 1 | 2 | 3 | 4 | 5 | 6 | 7 | 8 | - COL. # |
|---|---|---|---|---|---|---|---|---|---|---|
| 0 | r | · | · | r | · | · | r | · | · | |
| 1 | r | · | · | r | · | · | r | · | · | |
| 2 | r | · | · | r | · | · | r | · | · | |
| 3 | r | · | · | r | · | · | r | · | · | |

ROW #

FIG. 6

|  | 0 | 1/3 | 2/3 | 1 | 4/3 | 5/3 | 2 | 7/3 | 8/3 | - REAS-SIGNED COLUMN INDICES |
|---|---|---|---|---|---|---|---|---|---|---|
| ROW 0 - $s_{rec}(j)$ | r | R | R | r | R | R | r | R | R | |
|  | \| | \| | \| | \| | \| | \| | \| | \| | | |
|  | \| | \| | \| | \| | \| | \| | \| | \| | | |
|  | \| | \| | \| | \| | \| | \| | \| | \| | | |
|  | \| | \| | \| | \| | \| | \| | \| | \| | | |
| ROW 0 - $s_{rec}(j,o)$ | r | R | R | r | R | R | r | R | R | |
|  | 0 | 1 | 2 | 3 | 4 | 5 | 6 | 7 | 8 | - ORIGINAL COLUMN INDICES |

FIG. 7

|  | 0 | 1 | 2 | 3 | 4 | 5 | 6 | 7 | 8 | - COL. # |
|---|---|---|---|---|---|---|---|---|---|---|
| 0 | r | R | R | r | R | R | r | R | R | |
| 1 | r | R | R | r | R | R | r | R | R | |
| 2 | r | R | R | r | R | R | r | R | R | |
| 3 | r | R | R | r | R | R | r | R | R | |
| ROW # | | | | | | | | | | |

FIG. 8

|   | 0 | 1 | 2 | 3 | 4 | 5 | 6 | 7 | 8 | - COL. # |
|---|---|---|---|---|---|---|---|---|---|---|
| 0 |   | rGB | RgB | RGb | rGB | RgB | RGb | rGB | RgB | RGb |
| 1 |   | rGB | RgB | RGb | rGB | RgB | RGb | rGB | RgB | RGb |
| 2 |   | rGB | RgB | RGb | rGB | RgB | RGb | rGB | RgB | RGb |
| 3 |   | rGB | RgB | RGb | rGB | RgB | RGb | rGB | RgB | RGb |

ROW #

FIG. 9

|   | 0 | 1 | 2 | 3 | 4 | 5 | 6 | 7 | 8 | 9 | 10 | 11 | 12 | 13 | 14 | 15 | 16 - COL. # |
|---|---|---|---|---|---|---|---|---|---|---|---|---|---|---|---|---|---|
| 0 | r | g | b | g | b | r | g | b | r | g | r | b | g | b | r | g |
| 1 | g | r | g | r | b | g | b | r |   |   |   |   |   |   |   |   |
| 2 | r | b | g | r | b | g | b | r | g | b | r | b | r | g | b | r |
| 3 | g | r | g | r | b | g | b | r |   |   |   |   |   |   |   |   |

ROW #

| ROW # | 0 | 1 | 2 | 3 | 4 | 5 | 6 | 7 | 8 | 9 | 10 | 11 | 12 | 13 | 14 | 15 | 16 | ORIGINAL COL. # |
|---|---|---|---|---|---|---|---|---|---|---|---|---|---|---|---|---|---|---|
| 0 | r | • | • | R | • | • | r | • | • | R | • | • | r | • | • | R | • | |
| 1 | R | • | • | r | • | • | R | • | • | r | • | • | R | • | • | r | • | |
| 2 | r | • | • | R | • | • | r | • | • | R | • | • | r | • | • | R | • | |
| 3 | R | • | • | r | • | • | R | • | • | r | • | • | R | • | • | r | • | |
|   | 0 | 1 |   | 2 |   |   | 3 |   |   | 4 |   |   | 5 - REINDEXED COLUMN # |

FIG. 12

| | 0 | 1 | 2 | 3 | 4 | 5 | 6 | 7 | 8 | 9 | 10 | 11 | 12 | 13 | 14 | 15 | 16 | ORIGINAL COLUMN INDICES |
|---|---|---|---|---|---|---|---|---|---|---|---|---|---|---|---|---|---|---|
| ROW0-Shex(i,0) | r | • | • | R | • | • | r | • | • | R | • | • | r | • | • | R | • | - INTERMEDIATE INDICES |
| | 0 | | 1 | | | 2 | | | | | | | | | |
| | 0 | | 1/2 | | 7/6 | | 11/6 | | | | | | | | | | | |
| ROW0-S(j) | | R | | R | | | R | | | | | | | | | - REASSIGNED COLUMN INDICES |
| | 0 | 1 | 2 | 3 |

SYSTEM AND METHOD FOR COLOR RECOVERY USING DISCRETE COSINE TRANSFORMS

RELATED APPLICATIONS

This application is a continuation-in-part of U.S. patent application No. 08/159,795 filed 30 Nov. 1993, now abandoned, by Munib A. Wober and Michael L. Reisch which was abandoned in favor of U.S. patent application Ser. No. 08/427,457 filed on Apr. 24, 1995. Furthermore, this application is related to concurrently filed and commonly assigned U.S. patent application Nos. 08/440,666; 08/441,383; 08/440,651; 08/440,639; 08/440,631; 08/440,647; and 08/441,372.

BACKGROUND OF THE INVENTION

1. Field of the Invention

The invention relates generally to an improved image processing system and methods for use with this system. More particularly, the invention relates to a system and methods thereto for image color recovery.

2. Description of the Prior Art

Images can be thought of as two-dimensional representations of some visual reality that is distributed in space and/or time. Ordinarily, images are what the human visual system perceives as variations in external stimuli such as brightness, color, and sometimes depth cues. While over the years many techniques have been developed to capture and reproduce images, their representation as continuous, discrete, or digital signals which can be manipulated, processed or displayed through the use of computers or other special purpose electronic hardware is the most recent technique. Now well-established, this latest technique has a variety of beneficial applications. For instance, while in electronic form, images can be enhanced to create special visual effects, restored, coded for transmission to distant locations, stored in memory (such as on CDROM, DAT, floppy disks, etc.), reconstructed, displayed, or converted to some other tangible form.

Image processing can occur in various domains such as the spatial domain or the frequency domain. An image is said to reside in the spatial domain when the values of the parameters used to describe it, such as chrominance, have a direct correspondence with spatial location. In the frequency domain, the image of the spatial domain may be represented by a series of frequency components in the form of trigonometric functions which, when summed for each image data point (i.e., pixel) of the spatial domain, yields the value of the parameter used to characterize the image at that particular image data point in the spatial domain. Such a representation may be extended to cover all image data points of an image.

In the spatial domain, original image data may be represented as a continuous function of spatial position, designated $s_c(y,x)$ for the two-dimensional case. For most applications it is acceptable, as well as advantageous, to sample this continuous-space image along the horizontal and vertical directions at $x=iT_h$ and $y=jT_v$, where i and j are integer indices and $T_h$ and $T_v$ are the horizontal and vertical sampling periods, respectively. This yields a matrix of points, $s_c(jT_v,iT_h)$ which shall be identified henceforth with the discrete signal designated as $s(j,i)$ for the two-dimensional case where the lower case, s, designates the spatial domain, i is the index of rows, j is the index of columns, and i and j can be initialized to start at zero. In the frequency domain, matrices can also be used to mathematically describe an image as a set of transform coefficients (also referred to as frequency coefficients) which represent frequency data in a transform matrix conventionally designated, $S(v,u)$, where the upper case, S, designates the frequency domain, u is the index of rows and v is the index of columns.

Spatial image data points may be transformed to the frequency domain using transformations such as Fourier transforms or discrete cosine transforms. The use of discrete cosine transforms and inverse discrete cosine transforms for image compression is well known in the art and, in fact, the practice has been adopted as standard in industry by The Joint Photographic Experts Group (JPEG) and the Motion Picture Experts Group (MPEG), which were created as part of a joint effort of the Consultative Committee on International Telegraphy and Telephony (CCITT) and The International Standards Organization (ISO).

When a discrete even cosine transformation (hereinafter DCT) is used, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete cosine transformation is defined as a transform that maps an image from the original image data points $s(j,i)$ in the spatial domain to DCT coefficients $S(v,u)$ in the DCT domain according to the basis function of the forward DCT, whereas an inverse discrete even cosine transformation (or IDCT) is defined as a transform that maps the DCT coefficients $S(v,u)$ from the DCT domain to reconstructed image data points $\hat{s}(j,i)$ in the spatial domain according to the basis function of the IDCT.

Processing an electronically acquired image in an image processing system sometimes includes image color recovery. The primary object of the current invention is to provide a system for color recovery of an image which is more efficient than existing systems and which is complementary to international compression standards such as ISO/IEC 10918-1, Section A.3.3 set by the International Organization of Standards, Joint Photographic Experts Group and similar standards recognized by the Motion Picture Experts Group. Other objects of the invention will, in part, appear hereinafter and, in part, be obvious when the following detailed description is read in conjunction with the drawings.

SUMMARY OF THE INVENTION

Full color resolution of an image is realized by reconstructing an array of image data points into a shifted array of pseudo pixels. The particular grid type of the array will dictate whether color recovery uses only vertical resolution, only horizontal resolution, vertical resolution followed by horizontal resolution, or horizontal resolution followed by vertical resolution. For each color channel, interpolation of missing color components is accomplished by first, taking a DCT of image data points, then taking a modified IDCT of the DCT coefficients.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein:

FIG. 1 is a preferred embodiment of an electronic imaging system according to the invention;

FIG. 5 is a diagrammatic representation of a rectangular grid having vertical stripes of red, green and blue pixels;

FIG. 6 is a diagrammatic representation of the red channel of the rectangular grid of FIG. 5;

FIG. 7 is a diagrammatic representation showing the relationship at row 0 between the original indices of $s_{rec}(j,0)$ and the reassigned integer indices of $s(j)$;

FIG. 8 is a diagrammatic representation of both actual and interpolated red component values for each pixel of the rectangular grid of FIG. 5 after vertical color resolution has been performed on the red channel;

FIG. 9 is a diagrammatic representation of both actual and interpolated red, green and blue component values amounting to full color resolution of the rectangular grid of FIG. 5;

FIG. 10 is a diagrammatic representation of a hexagonal grid having every other row of pixels offset by one-half pixel width;

FIG. 11 is a diagrammatic representation of the red channel of the hexagonal grid of FIG. 10;

FIG. 12 is a diagrammatic representation showing the relationship at row 0 between the original indices of $s_{hex}(j,0)$ and the reassigned integer indices of $s(j)$;

FIG. 13 is a diagrammatic representation of both actual and interpolated red component values for each pixel of the hexagonal grid of FIG. 10 after vertical color recovery has been performed for the red channel;

FIG. 14 is a diagrammatic representation useful for explaining the calculation of pseudo-pixels for the red channel obtained when performing horizontal color recovery on the vertically color recovered pixels of FIG. 13; and FIG. 15 is a diagrammatic representation of full color resolution of the hexagonal grid of FIG. 10, represented as pseudo-pixels indexed as explained in reference to FIG. 12.

DETAILED DESCRIPTION OF THE PREFERRED EMBODIMENTS

Figure 2A:
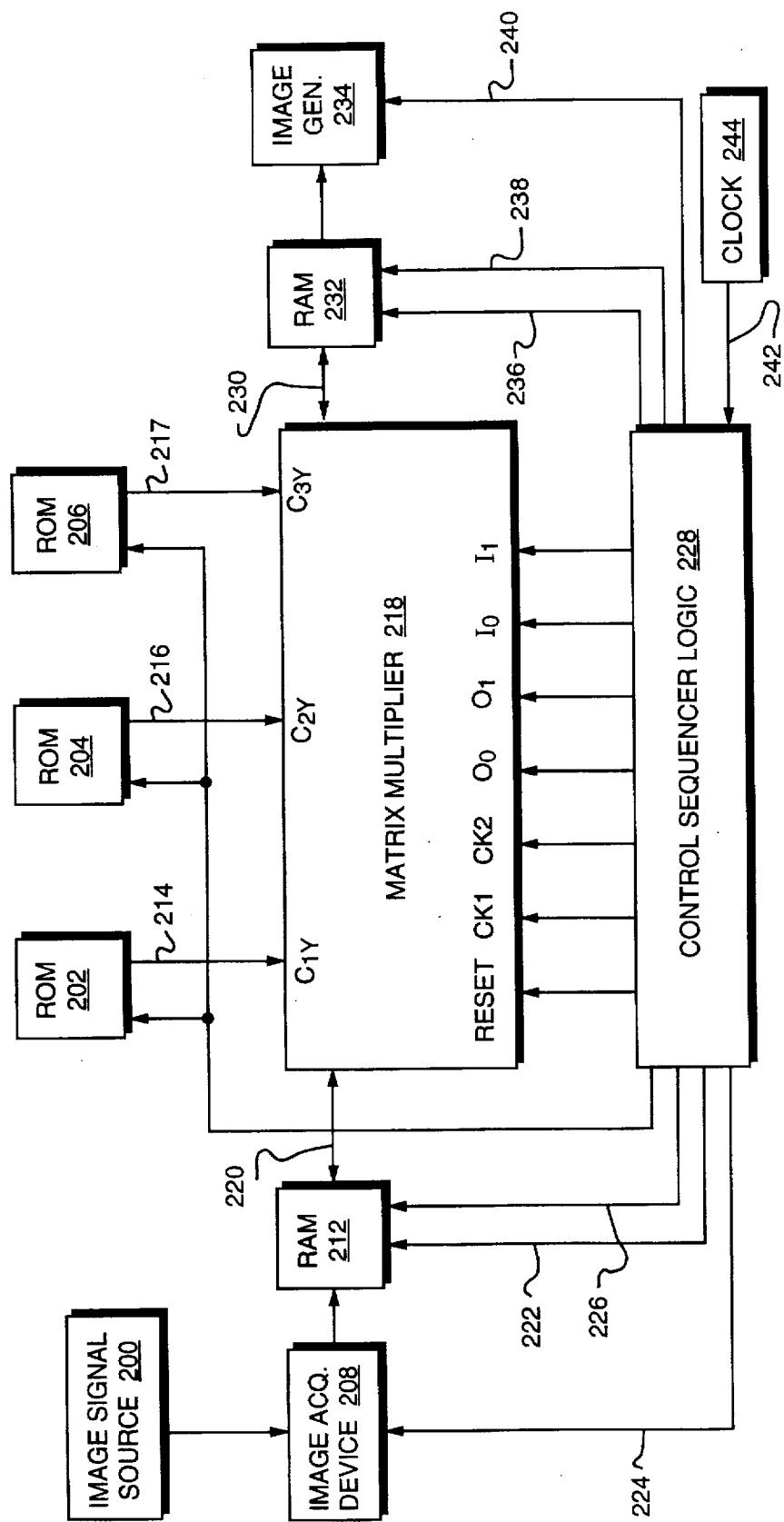
FIG. 2A is a detailed block diagram of the electronic imaging system of FIG. 1.

The present invention relates to an image processing system and associated image processing methods for color recovery of an image. FIG. 1 illustrates one exemplary embodiment of such a system. As can be seen, FIG. 1 illustrates an electronic image processing system where an image signal source, such as an electronic still camera 10 or a scanner 12, provides an electronic image signal which represents an image of the subject (not shown). A computer 18 receives the electronic signal from the image signal source and thereafter processes the image signal electronically to provide any number of known image processing functions such as resizing, sharpening, noise removal, reflection, edge detection or color recovery. The processed image can be transmitted, i.e. output, to any destination device or destination application such as a diskette 16, an user monitor 20, a printer 14, or a remote monitor 26. Operator interaction with the system is facilitated by use of a keyboard 22 or a mouse 24. Of course, the components shown in FIG. 1 are merely exemplary rather than all inclusive of the many equivalent devices known by those skilled in the art. For instance, the image signal source could include any device which acts as an image signal source such as an electronic camera, a scanner, a camcorder, a charge coupled device, a charge injected device, etc. Also, it is noteworthy that the processing of the image need not necessarily occur solely in the computer 18. Indeed, various phases or aspects of the image processing could occur in the image signal source, the computer, or the destination output device.

The image processing system of FIG. 1 is further detailed in FIG. 2A which includes an image signal source 200 connected to an image acquisition device 208, which, in turn, is connected to RAM 212 and control sequencer logic 228. The RAM 212 is also connected to a matrix multiplier 218 and the control sequencer logic 228. The control sequencer logic 228 and the matrix multiplier 218 are connected to one another and are both connected to ROM 202, ROM 204, ROM 206, and RAM 232. The RAM 232 and the control sequencer logic 228 are both connected to an image generator 234 which represents any type of device capable of outputting an image, such as a printer, a CRT display, etc. The control sequencer logic 228 receives a clock pulsetrain 242 from system clock 244.

1. DCT Mathematics

The following mathematical discussion sets forth certain fundamental concepts relating to forward and inverse discrete cosine transforms.

An image is typically made up of a two-dimensional PxQ array of descriptors called pixels or image data points, where P is the number of rows and Q is the number of columns representing the image. The image can be represented by either image data points in the spatial domain, or by corresponding DCT coefficients in the frequency domain. A forward DCT generates the DCT coefficients by taking a discrete even cosine transformation (DECT abbreviated as DCT) of the image data points. Conversely, an inverse discrete even cosine transformation (IDECT abbreviated as IDCT) generates the IDCT coefficients (i.e. reconstructed image data points) by taking an inverse discrete cosine transformation of the DCT coefficients.

A DCT transformation can occur in any number of dimensions as understood by those skilled in the art. In the following one-dimensional example, a row (more generically referred to as a segment) of N image data points $s(j)$ can be transformed from the spatial domain to corresponding DCT coefficients $S(v)$ in the frequency domain in accordance with equation (1).

$$S(v) = C_v \sqrt{\frac{2}{N}} \sum_{j=0}^{N-1} s(j) \cos \frac{(2j+1)v\pi}{2N} \quad (1)$$

where: $0 \leq v \leq (N-1)$, v an integer;

s(j) represents the matrix of image data points in the segment;

S(v) represents the corresponding matrix of DCT coefficients;

N represents the number of image data points in the segment;

$$C_v = \frac{1}{\sqrt{2}} \text{ for } v = 0; \text{ and}$$

$$C_v = 1 \text{ for } v \neq 0.$$

The DCT coefficients S(v) are determined from equation (1) where the normalized cosine basis terms are derived for a segment having N image data points. The value for S(0) is determined for v=0 by summing each of the image data points s(j) for $0 \leq j \leq (N-1)$ times the cosine terms of the basis function. The value for S(1) is determined as the summation of image data points s(j) times the cosine terms for v=1. This procedure, which indexes first on v and then on j, is repeated for derivation of DCT coefficients S(0) through S(N-1).

A modified inverse discrete cosine transformation is mathematically defined in equation (2) where the one-dimensional matrix S(v) of DCT coefficients is transformed to a reconstructed matrix ŝ(y) of reconstructed image data points, and y is defined as a real number within the given range as disclosed and explained in parent application '795.

$$\hat{S}(y) = \sqrt{\frac{2}{N}} \sum_{v=0}^{N-1} C_v S(v) \cos \frac{(2y+1)v\pi}{2N} \quad (2)$$

where: $0 \leq y \leq (N-1)$, y a real number;

S(v) represents the matrix of DCT coefficients;

ŝ(y) represents the spatial matrix of reconstructed image data points;

N represents the number of image data points in the segment;

$$C_v = \frac{1}{\sqrt{2}} \text{ for } v = 0; \text{ and}$$

$$C_v = 1 \text{ for } v \neq 0.$$

If the DCT coefficients S(v) of equation (1) are computed from a set of image data points s(j) and the reconstructed image data points ŝ(y) of equation (2) are computed from the corresponding DCT coefficients S(v), then s(j)≡ŝ(y) when y=j, and the process is referred to as invertible or one-to-one mapping since the reconstructed image data points of ŝ(y) are identical, within limits, to the original image data points of s(j). By evaluating y in equation (2) at other (non-integer) values where $0 \leq y \leq (N-1)$, a modified IDCT is obtained which can be used for various processes such as the interpolation of values falling between discrete image data points which represent an image.

In determining the values representing the reconstructed image data points ŝ(y) using equation (2), ŝ(0) is determined by summing each of the DCT coefficients S(v) times the cosine terms of the inverse basis function for y=0. For example, the value for ŝ(0.5) is determined as the summation of DCT coefficients S(v) times the cosine terms for y=0.5. This procedure, which indexes first on y then on v, is repeated for derivation of all desired reconstructed image data points ŝ(y) where $0 \leq y \leq (N-1)$.

As earlier noted, the above mathematics can be readily expanded to multiple dimensions as known by one of ordinary skill in the art. For instance, an image can be represented in the spatial domain in two-dimensional format as described in parent application '795, where s(y,x) represents the image data points at real values y and x in the spatial domain, S(v,u) represents the corresponding DCT coefficients in the frequency domain, x ranges from 0 to (P−1), y ranges from 0 to (Q−1), P represents the total number of rows, and Q represents the total number of columns. The image data points s(y,x) may represent, but are not limited to, parameters such as brightness, luminance, color or hue.

Both equations (1) and (2) can alternatively be expressed in matrix notation. The matrix notation (without indices) for equation (1) is:

$$S = FB \cdot s \quad (3)$$

where Ŝ represents the matrix of DCT coefficients, s represents the matrix of image data points in the spatial domain, and FB represents the forward DCT basis matrix. The matrix notation for equation (2) is:

$$\hat{s} = IB \cdot S \quad (4)$$

where S represents the spatial matrix of reconstructed image data points, and IB represents the inverse DCT basis matrix for the desired output points (i.e. reconstructed image data points). Combining matrix equations (3) and (4) will reduce the number of arithmetic operations as opposed to performing the matrix algebra in two different steps as previously described. Combining matrix equations (3) and (4) yields:

$$\begin{aligned} \hat{s} &= IB \cdot (FB \cdot s) \\ &= MB \cdot s \end{aligned} \quad (5)$$

where MB is a combined DCT basis matrix derived from matrix multiplication of the inverse DCT basis matrix IB times the forward DCT basis matrix FB. The combined DCT basis matrix MB can be contemporaneously calculated while solving equation (5), or MB can be precalculated and stored in a look-up table.

2. Color Recovery Hardware

One preferred embodiment of an image color recovery system (as shown in FIG. 2A) includes: image acquisition device 208; matrix multiplier 218; random access memory (RAM) image buffers 212 and 232; coefficient read only memory (ROM) 202, 204 and 206; control sequencer logic 228; master clock 244; and image generator 234. The master clock 244 produces a master clock signal 242 which is used by the control sequencer logic 228 to generate clock signals CK1 and CK2. The image signal source 200 could be any device or system for providing an image such as a camera, scanner, charge-coupled device, etc. The image acquisition device 208 represents any hardware component which is capable of receiving the image signal from source 200, such as an A/D converter, input buffer, input port, etc. Similarly, the image generator 234 could be any device or system for generating an image from the coefficients stored in RAMs 212 or 232, such as a printer, cathode ray tube, etc. This overall hardware configuration is general purpose for implementing a variety of matrix product operations.

Figure 2B:
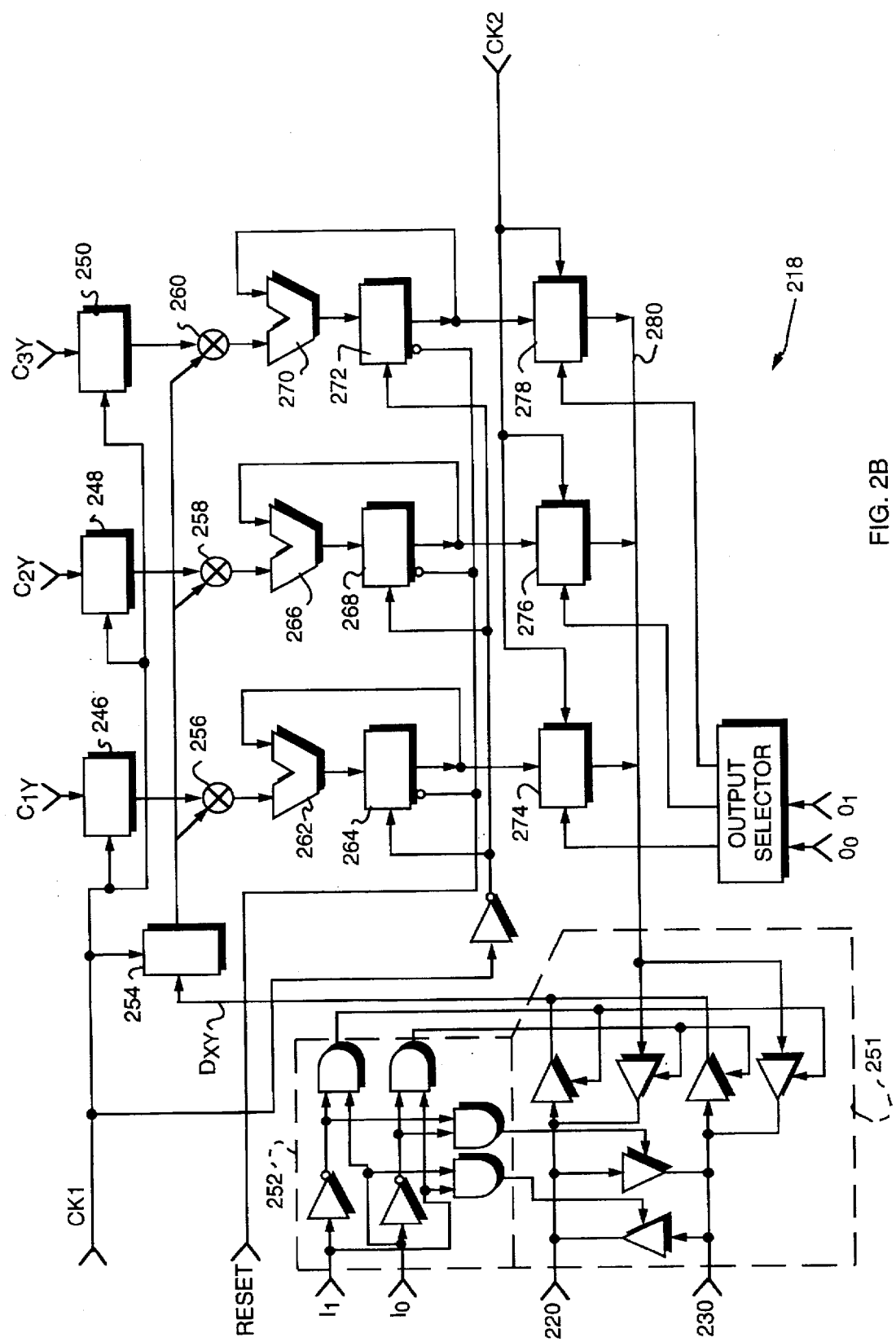
FIG. 2B is a logic diagram of the matrix multiplier 218 of FIG. 2A.
Figure 2C:
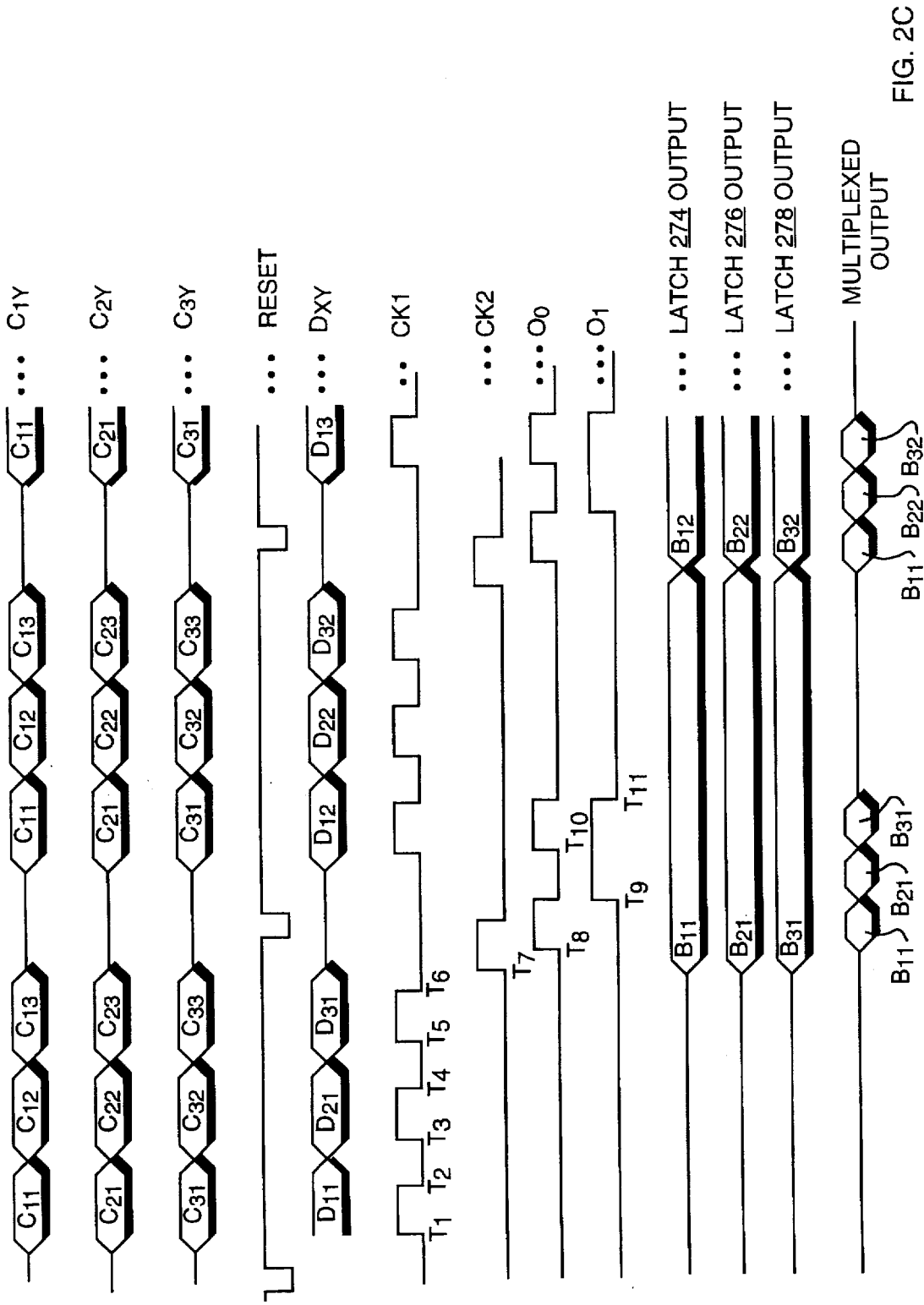
FIG. 2C is a timing diagram of signals used and generated by the system of FIG. 2A.

Referring to FIGS. 2A, 2B and 2C, the matrix multiplier logic 218 is a fixed point parallel arithmetic processor capable of computing a 3×3 matrix product in nine CK1 clock cycles. The control sequencer logic 228 generates clock pulses CK1 and CK2 from the master clock 244. The buffers 212 and 232 are random access memories to buffer the input and output images; the read only memories 202, 204 and 206 store precomputed coefficient matrices; and the control sequencer logic 228 is used to handle control signals, timing signals, and memory address signals.

The matrix multiplier logic 218 is a three fixed-point multiplier accumulator (MAC) array shown in detail in FIG. 2B, with input/output latches and two bidirectional data buses 220 and 230. The buses 220 and 230 are configurable to transmit data directly between RAM 212 and RAM 232 in pass through mode, or to transmit data to the matrix multiplier logic 218 for processing in process mode according to Truth Table I which the functions of data buses 220 and 230 as controlled by signals $I_0$ and $I_1$.

TRUTH TABLE I

| $I_0$ | $I_1$ | 220 | 230 | Mode |
| --- | --- | --- | --- | --- |
| 0 | 0 | IN | OUT | Pass thru |
| 1 | 0 | IN | OUT | Process |
| 0 | 1 | OUT | IN | Process |
| 1 | 1 | OUT | IN | Pass thru |

The three MAC units include multipliers 256, 258, and 260 followed by the adder and accumulator pairs {262, 264}, {266, 268}, and {270, 272}, respectively. The outputs of the accumulators 264, 268 and 272 are stored, respectively, in output latches 274, 276, and 278. These provide temporary storage to multiplex the results onto the common output bus 280.

The control sequencer logic 228 controls the memories and data buses as well as generating appropriate timing signals for the matrix multiplier logic 218. Specifically, the control sequencer logic 228 provides to RAM memories 212 and 232, respectively, address data on lines 222 and 238, and read/write (R/W) control data on lines 226 and 236. The control sequencer logic 228 also provides the matrix multiplier logic 218 with clock signals CK1 and CK2 (derived from master clock signal 242), bus directional signals $I_0$, $I_1$; output multiplex control signals $O_0$, $O_1$; and addresses on line 210 for ROMs 202, 204 and 206. The control sequencer logic 228 is easily implemented with a microcontroller or programmable logic array (PLA), the choice being application dependent. The former is generally more flexible from a programming standpoint but somewhat higher in cost than the latter.

The operation of the matrix multiplier logic 218 is easily understood by considering an example of a 3×3 matrix multiplication where C represents a coefficient matrix, D represents a source image data matrix, and B represents the result of matrix multiplying C times D. Thus, for $$\begin{pmatrix} B_{11} & B_{12} & B_{13} \\ B_{21} & B_{22} & B_{23} \\ B_{31} & B_{32} & B_{33} \end{pmatrix} = \begin{pmatrix} C_{11} & C_{12} & C_{13} \\ C_{21} & C_{22} & C_{23} \\ C_{31} & C_{32} & C_{33} \end{pmatrix} \times \begin{pmatrix} D_{11} & D_{12} & D_{13} \\ D_{21} & D_{22} & D_{23} \\ D_{31} & D_{32} & D_{33} \end{pmatrix} \quad (6)$$

consider the first column of B which is the sums of products of the rows of C and the first column of D, $$\begin{pmatrix} B_{11} \\ B_{21} \\ B_{31} \end{pmatrix} = \begin{pmatrix} C_{11}D_{11} + C_{12}D_{21} + C_{13}D_{31} \\ C_{21}D_{11} + C_{22}D_{21} + C_{23}D_{31} \\ C_{31}D_{11} + C_{32}D_{21} + C_{33}D_{31} \end{pmatrix} \quad (7)$$

The timing diagram in FIG. 2C shows the relationship of the control and data signals for this example. The computation proceeds sequentially with the evaluation of the first, second, and third columns of the B matrix. The process begins with the clearing of the accumulators by the negative RESET pulse received by the matrix multiplier logic 218 from the control sequencer logic 228. The first column of matrix C, that is, $C_{11}$, $C_{21}$, $C_{31}$, and the first element of the first column of matrix D, that is $D_{11}$, are transferred to input latches 246, 248, 250 and 254 respectively at time $T_1$, of clock pulse CK1. Specifically, $C_{11}$ is received from ROM 202 by input latch 246, $C_{12}$ is received from ROM 204 by input latch 248, $C_{13}$ is received from ROM 206 by input latch 250, and $D_{11}$ is received through the bus transmitter 252 from RAM 212 which stores the source image. The control signals $I_0$ and $I_1$ control both the transfer, and the direction of transfer of data between the matrix multiplier logic 218 and RAMs 212 and 234 according to Truth Table I. The logic corresponding to Truth Table I is shown by logic 252 and bus transmitter 251. At time $T_2$ the products $C_{11}D_{11}$, $C_{21}D_{11}$, and $C_{31}D_{11}$ are stored in accumulators 264, 268, and 272, respectively. Logic (not shown) for scaling the outputs, i.e. truncating data, would typically follow the accumulators, as well known by those skilled in the art, to handle data overflow conditions. At time $T_3$ the second column of matrix C, that is, $C_{12}$, $C_{22}$, and $C_{32}$, and the second element $D_{21}$ of the first column of D are transferred to the input latches 246, 248, 250 and 254, respectively. The partial sum of products, that is, $C_{11}D_{11}+C_{12}D_{31}$, $C_{21}D_{11}+C_{22}D_{21}$, $C_{31}D_{11}+C_{32}D_{21}$ are stored at time $T_4$ in accumulators 264, 268, and 272 respectively. Of course, multiplication occurs in multipliers 256, 258, 260 and addition occurs in adders 262, 266, 270. The process repeats for the third column of C and third element of the first column of D resulting at $T_6$ in the first column of B having elements $\{C_{11}D_{11}+C_{12}D_{21}+C_{13}D_{31}\}$, $\{C_{21}D_{11}+C_{22}D_{21}+C_{23}D_{31}\}$ and $\{C_{31}D_{11}+C_{32}D_{21}+C_{33}D_{31}\}$ which were obtained as the sum of the products of the rows C and the first column of D (see equation (7)).

At the rising edge of clock pulse CK2 at time $T_7$ the data from accumulators 264, 268, and 272 is transferred to the output latches 274, 276, and 278, respectively. Output multiplex control signals $O_0$ and $O_1$ time multiplex the outputs of the output latches onto data bus 220 or 230 in accordance with Truth Table I at times $T_8$, $T_9$, and $T_{10}$. The whole process is repeated in this fashion for computing the remaining second and third columns of B in equation (6).

The first and second rows of both the horizontal and vertical transform matrices are stored in ROMs 202 and 204, respectively; the source image is stored in RAM 212; and the rotated image is stored in RAM 232. Note that the matrix multiplier logic 218 is clearly able to handle products of matrices other than order three. For example, vector products, as well as 2×2 matrix products can be easily processed.

Of course, functional equivalents of the above described components would work equally well in implementing the color recovery system. For instance, the memories are not limited to RAMs or ROMs but include any type of known memory devices. Also as earlier noted, the coefficients stored in ROMS 202, 204 and 206 could be precalculated as a combined reconstruction vector to be multiplied times the source pixels received from RAM 212 rather than as precalculated modified IDCT basis coefficients to be multiplied times precalculated DCT coefficients stored in RAM 212.

Color recovery using the image processing system of FIG. 2A first provides reconstruction of a first, e.g. red, channel in the vertical direction. This process is an interpolation of the red component based on a predetermined number of vertically adjacent actual (measured) red pixel values. Column segments retrieved from RAM 212 are multiplied times the modified IDCT basis vector, i.e. the reconstruction vector, stored in ROM 202 to produce estimated reconstructed pixels that are located between actual red pixel locations. The processed, reconstructed red pixel values are stored in odd memory locations of RAM 232 whereas the actual red pixel values are transferred in pass through mode to even memory locations of RAM 232. An alternative and equally effective approach is to generate all the reconstructed red pixels by interpolation without passing through the actual red pixel values, then storing all the reconstructed red pixel values into consecutive memory locations in RAM 232.

For horizontal reconstruction of the red channel, the reconstruction matrix and the DCT row segments are retrieved from RAM 232, processed in the matrix multiplier logic 218, then stored in RAM 212. The horizontal reconstruction process continues until all rows of the image have been retrieved, processed and stored in RAM 212. Once processing of the red channel is complete, the green and blue channels are processed in the same way and the image having full color resolution is available for transfer to an output device 234.

3. Color Recovery Methodology

A typical charge coupled device (CCD) camera consists of an array of picture elements, also referred to as pixels or image data points, arranged in a predetermined order and having corresponding detectors each allocated to a particular color band. In other words, a "blue pixel" describes a pixel associated with a detector responsive to the blue color band of about 400 to 500 nanometers, a "green pixel" describes a pixel associated with a detector responsive to the green color band of about 500 to 600 nanometers, and a "red pixel" describes a pixel associated with a detector responsive to the red color band of about 600 to 700 nanometers. Needless to say, each pixel is responsive to only about one third of the complete color spectrum and the rest of the color information is lost. The inventive color recovery system and method uses discrete cosine transforms to provide full color resolution for each pixel of the image, whereby full color resolution is defined as full color reproduction of each pixel throughout the complete color spectrum of approximately 400–700 nm so that each pixel will be chromatically represented by a blue component, a green component and a red component.

Figure 3A:
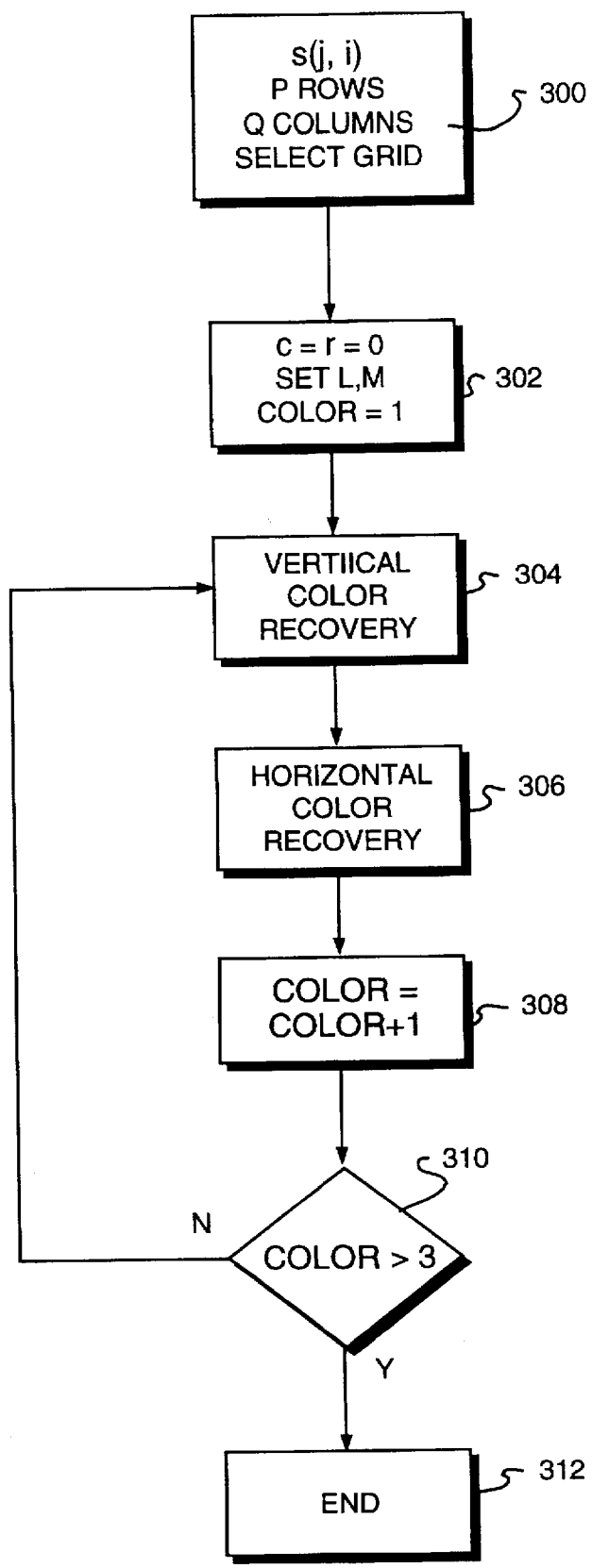
FIG. 3A is a flowchart diagram of DCT color recovery according to the invention whereby each color is recovered sequentially.
Figure 4:
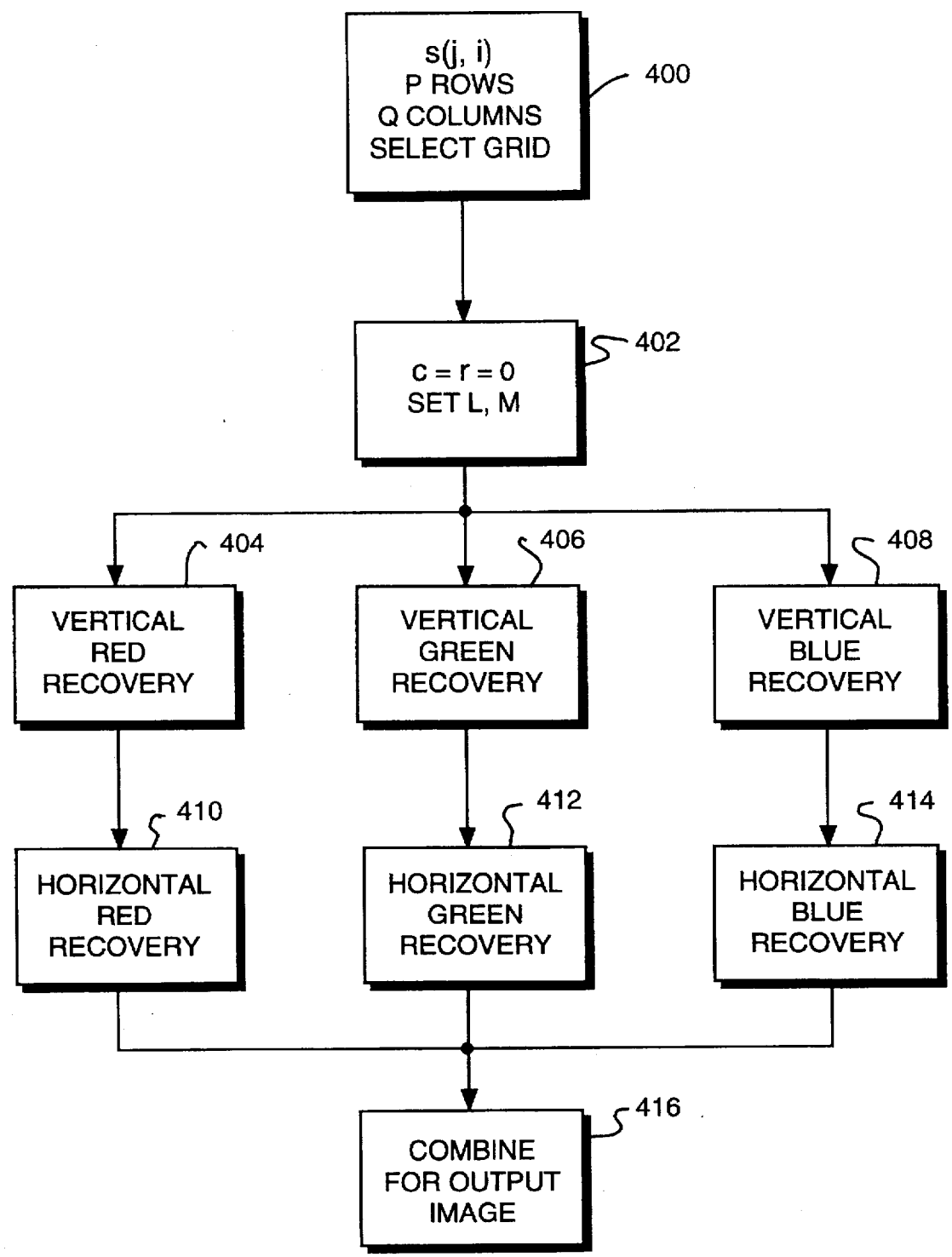
FIG. 4 is a flowchart diagram of DCT color recovery according to the invention whereby color recovery of each color occurs in parallel.

Color recovery is implemented on each color separately and in one-dimension, i.e. row followed by column or column followed by row. Each color can be processed using the color recovery system of FIG. 2A. Serial processing is shown in FIG. 3A, and parallel processing is shown in FIG. 4. Furthermore, the method of FIG. 3A can be altered, for instance, by interchanging the vertical and horizontal color recovery steps, or by omitting either one of the color recovery steps. Depending on the grid type, the color recovery method can be implemented using: (1) only vertical pixel reconstruction; (2) only horizontal pixel reconstruction; (3) vertical pixel reconstruction followed by horizontal pixel reconstruction; or (4) horizontal pixel reconstruction followed by vertical reconstruction. Note that the vertical and horizontal pixel reconstruction steps are the basic building blocks of the color recovery method. As noted above, they can be interchanged, set in any order, or even eliminated (if necessary), depending upon the geometry of the specific grid type targeted for color recovery.

FIG. 3A provides the following example of vertical color recovery followed by horizontal color recovery (i.e. column followed by row) for serial implementation of the third color recovery method listed above. An input image s(j,i) having P rows and Q columns is shown in block 300, where i is the row index and j is the column index. An equal number of red, green and blue pixels provides only one-third of the full color resolution at each pixel. For instance, a red pixel in the input image s(j,i) would detect a red component, but not detect any green or blue components. A grid type is selected in block 300 according to the characteristics of the imaging device, and in block 302 the row index r is initialized to zero, the column index c is initialized to zero, a row segment size is set to L, a column segment size is set to M, and a primary color indicator is set to 1 representing a first of three primary colors (although any number of primary colors could be used). After every pixel in the image is subjected to both vertical color recovery in block 304 and horizontal color recovery in block 306 for the first primary color, then the color channel is changed by setting color=color+1 in block 308. In block 310 it is determined whether all the primary color channels have gone through color recovery. When each pixel in the image has been subjected to color recovery for each primary color, then full color resolution of the image has been obtained, i.e. each pixel is represented by either an actual or interpolated red, green and blue component value.

Figure 3B:
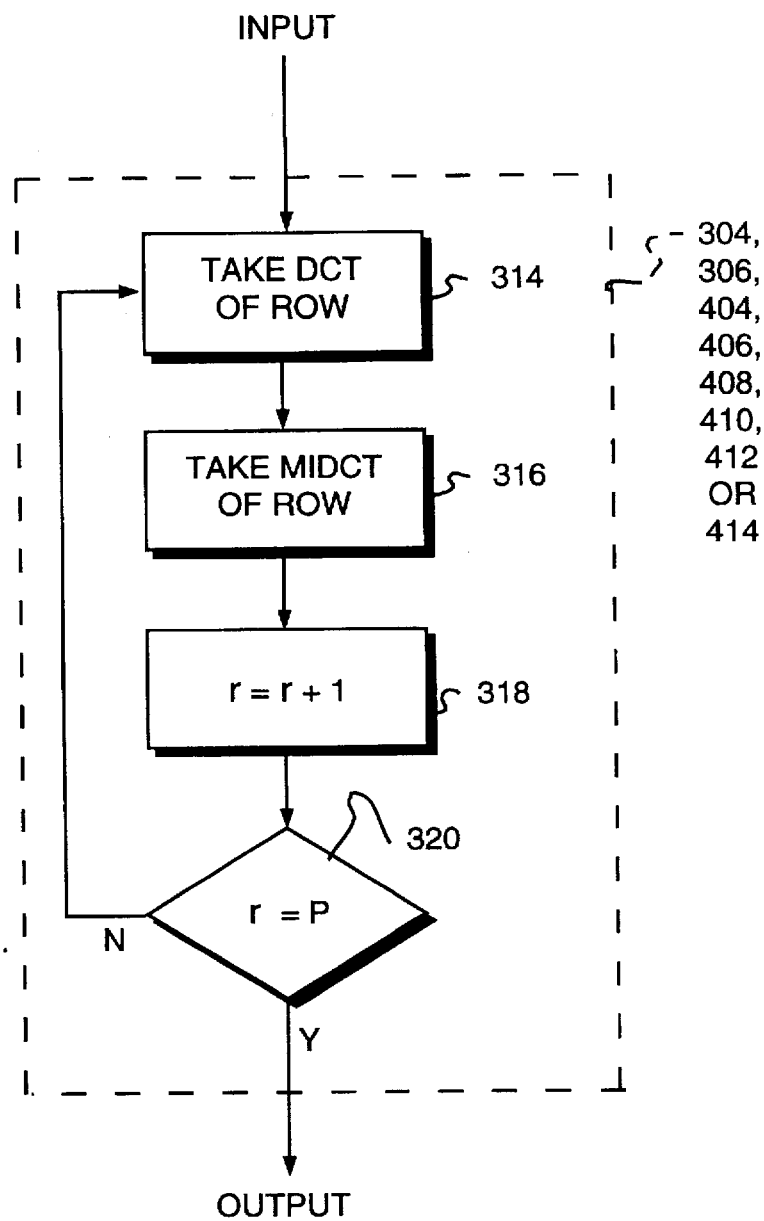
FIG. 3B is a flowchart diagram of the horizontal color recovery block 306 of FIG. 3A used when a segment size for interpolation equals the total number of pixels in a column.
Figure 3C:
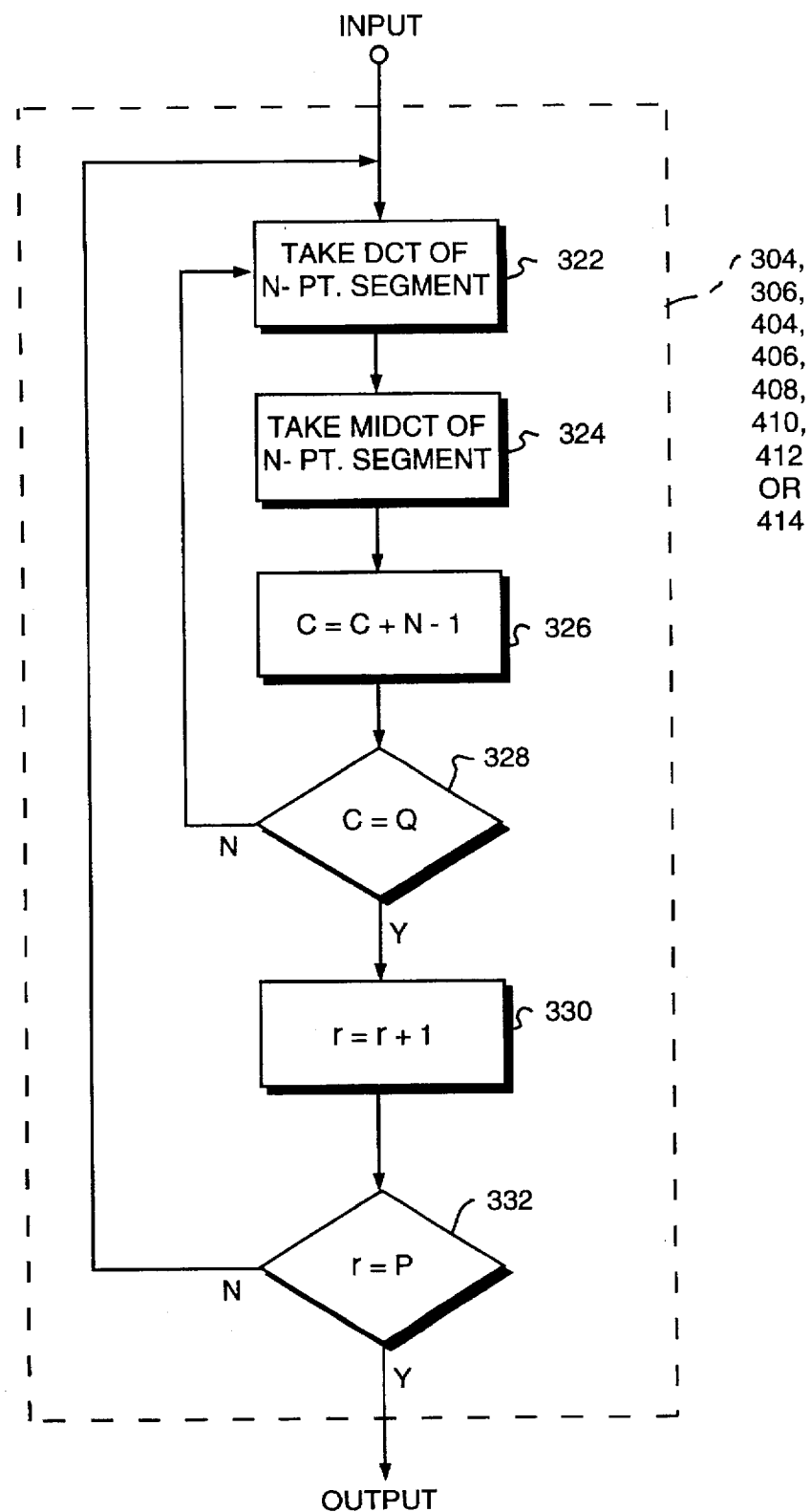
FIG. 3C is a flowchart diagram of the horizontal color recovery block 306 of FIG. 3A used when a segment size for interpolation equals less than the total number of pixels in a column.
Figure 3D:
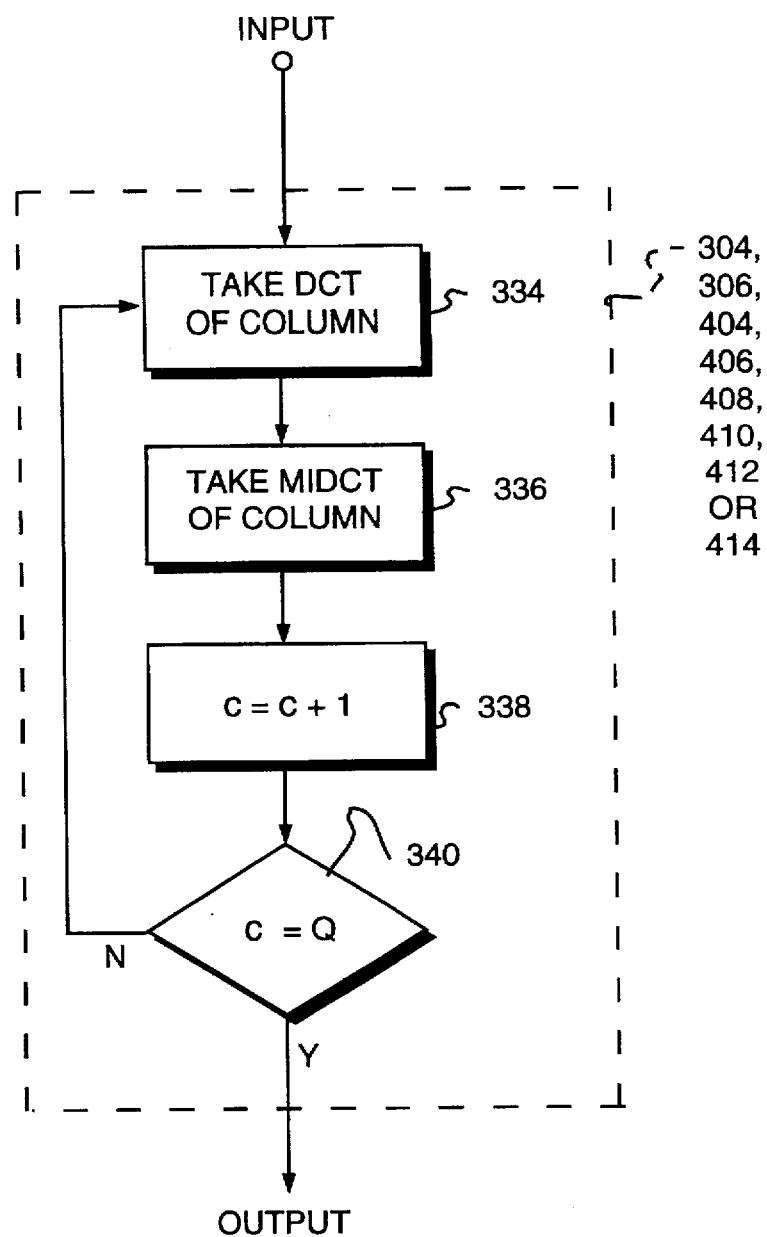
FIG. 3D is a flowchart diagram of the vertical color recovery block 304 of FIG. 3A used when a segment size for interpolation equals the total number of pixels in a row.
Figure 3E:
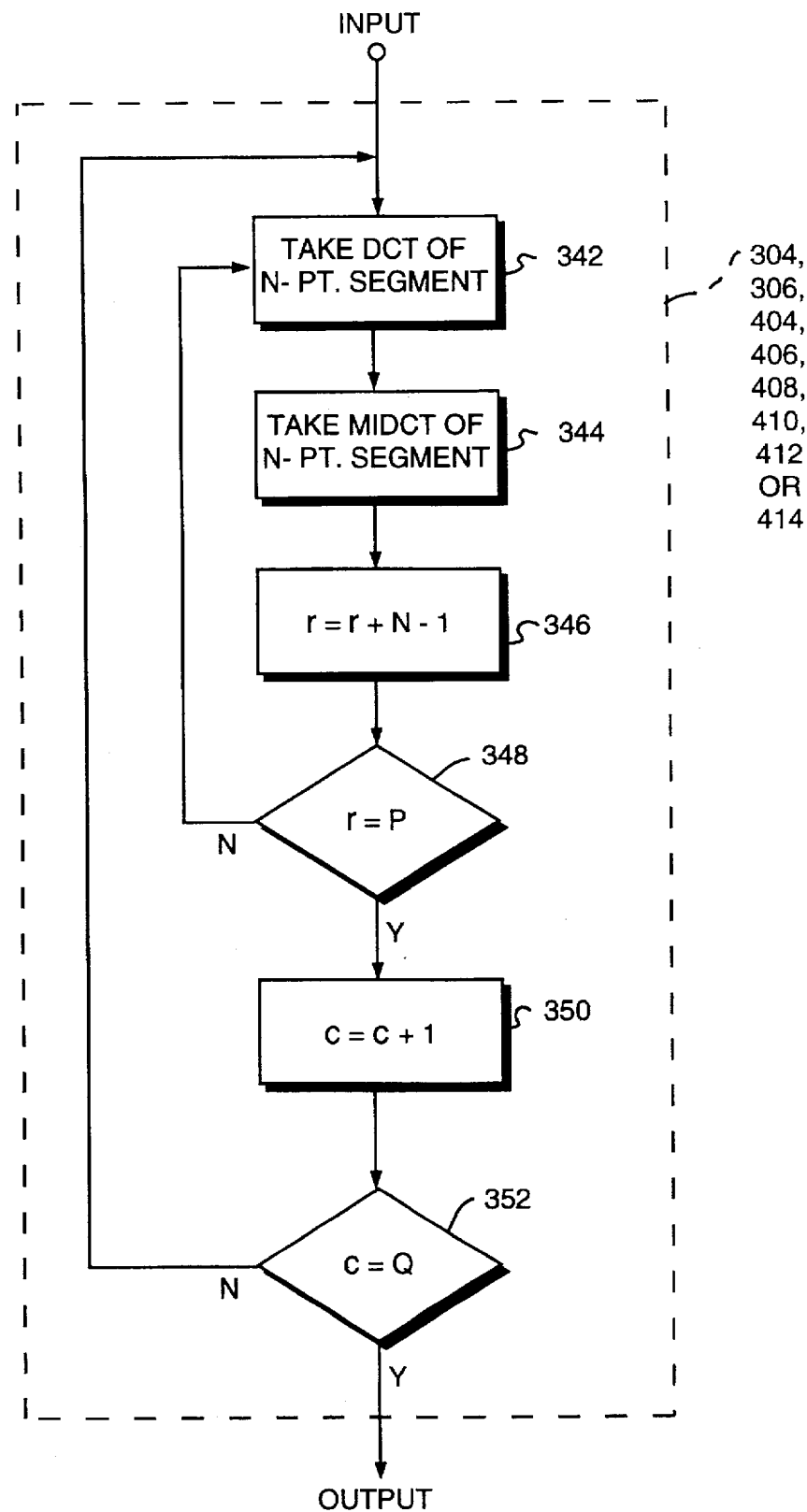
FIG. 3E is a flowchart diagram of the vertical color recovery block 304 of FIG. 3A used when a segment size for interpolation equals less than the total number of pixels in a row.

A parallel implementation of the third color recovery method listed above on a column followed by row basis is shown in FIG. 4. Input data including grid type is selected in block 400 and row and column segment sizes are set in block 402. The departure from the method of FIG. 3A comes when color recovery is performed in parallel (in blocks 404, 406, 408, 410, 412, 414), rather than serially, resulting in faster processing. Each of the color recovery processes of FIG. 4 can be implemented using a segment size equal to the number of image data points in a row or column as shown in FIGS. 3B and 3D, or using an N-point segment size with a one-point overlap (where N is less than the total number of pixels in a row or column) as shown in FIGS. 3C and 3E. The results of the parallel color recovery for each channel are combined in block 416 so that each color component is represented at each pixel location and the output image drawn from the processed pixels will exhibit full color resolution.

The color recovery methods and apparatus according to the invention can be applied to any type grid. The following examples include application of the color recovery method to, first, a commonly used rectangular grid pattern having vertical color stripes as shown in FIG. 5 and, second, a hexagonal grid pattern with geometry diverse from the rectangular grid, whereby every other row of pixels is offset by one pixel as shown in FIG. 10.

In applying the color recovery method to the 4 by 9 pixel rectangular grid $s_{rec}(j,i)$, shown in FIG. 5, each color component possesses full color resolution in the vertical direction and one-third color resolution in the horizontal direction. Specifically, the grid has four rows 0–3 and nine columns 0–8 wherein the red pixels are located in columns 0,3,6 at $s_{rec}(0,i)$, $s_{rec}(3,i)$ and $s_{rec}(6,i)$ respectively; the green pixels are located in columns 1,4,7 at $s_{rec}(1,i)$, $s_{rec}(4,i)$ and $s_{rec}(7,i)$ respectively; and the blue pixels are located in columns 2,5,8 at $s_{rec}(2,i)$, $s_{rec}(5,i)$ and $s_{rec}(8,i)$ respectively. The red pixels do not detect green or blue components, the green pixels do not detect red or blue components, and the blue pixels do not detect red or green components. The goal of the color recovery method for this example is to generate a 4 by 9 pixel output image having full color resolution as represented in FIG. 9 whereby each pixel has three color components (red, green, blue). In this discussion, the lower case letters (r,g,b) will represent actual (measured) color components and the upper case letters (R,G,B) will represent interpolated (estimated) color components. For instance, each pixel in column 0 of FIG. 9 contains an actual red component r, an interpolated green component G, and an interpolated blue component B.

Since the rectangular grid of FIG. 5 already contains full vertical color resolution, only horizontal color recovery needs to be done. Thus, the vertical color recovery step of block 304 in FIG. 3A is eliminated. Horizontal color recovery is performed on each row to interpolate missing color components. For example, the $i^{th}$ row of the red components has pixels located at $s(j)=s_{rec}(3j,i)$ where $j=0, 1, 2, \ldots$ and $s(j)$ is a one-dimensional representation of the measured red pixel values of the $i^{th}$ row of the rectangular grid $s_{rec}(j,i)$. The array $s_{rec}(3j,i)$ represents the measured red components. Similarly, the $i^{th}$ row of the green components has measured green components of $s_{rec}(j,i)$ located at $s(j)=s_{rec}(3j+1,i)$, where $s(j)$ is a one-dimensional representation of the measured green pixel values of the $i^{th}$ row of the rectangular grid $s_{rec}(j,i)$. The array $s_{rec}(3j+1,i)$ represents the measured green components. Finally, the $i^{th}$ row of the blue components has measured blue components of $s_{rec}(j,i)$ located at $s(j)=s_{rec}(3j+2,i)$, where $s(j)$ is a one-dimensional representation of the measured blue pixel values of the $i^{th}$ row of the rectangular grid $s_{rec}(j,i)$, and $s_{rec}(3j+2,i)$ represents the measured blue components.

Whenever either horizontal or vertical color recovery is selected so that L is set to the total number of image data points in a row (or M is set to the total number of image data points in a column), then the color recovery of blocks 304 or 306 will follow the steps outlined in FIGS. 3B or 3D. However, when an N-point interpolation is desired for color recovery of N-point segments of image data points in a column or row having a one-point overlap, then the color recovery will follow the steps outlined in FIGS. 3C or 3E. In the present example, a three-point interpolation with a one-point overlap is desired in the horizontal direction, so L is set to three in block 302 of FIG. 3A.

FIG. 6 shows the red channel prior to color recovery. Actual red color components are present at $s_{rec}(0,i)$, $s_{rec}(3,i)$ and $s_{rec}(6,i)$. All other pixel locations in the red image are devoid of red components, but any missing color components can be estimated through interpolation of the actual values. The interpolation can be advantageously implemented using discrete cosine transformations which are compatible with existing systems using current JPEG and MPEG compression standards.

The first step of horizontal color recovery for the red channel is performed by taking a three-point DCT in block 322 of FIG. 3C according to equation (1), where L=N=3, for the first three measured red image data points of row zero located at $s_{rec}(0,0)$ $s_{rec}(3,0)$ and $s_{rec}(6,0)$ as shown in FIG. 6. In order to facilitate the discrete cosine transformation of equation (1), the three points of the segment should be reindexed to a one-dimensional array so that $s(j)=s_{rec}(3j,0)$ for $j=0, 1, 2$ as shown in FIG. 7. Of course, the color recovery method is not limited to a single dimension, but could easily be expanded to multi-dimensional calculations, if desired, as known by those skilled in the art. Nevertheless, the DCT coefficients corresponding to $s(0)$, $s(1)$ and $s(2)$ are calculated as $S(0)$, $S(1)$ and $S(2)$ respectively. Next, a three-point modified IDCT according to equation (2) is performed in block 324 on the DCT coefficients $S(0)$, $S(1)$ and $S(2)$ for N=3 at $y=\frac{1}{3}, \frac{2}{3}, \frac{4}{3}, \frac{5}{3}$, yielding interpolated red component values at $\hat{s}(\frac{1}{3})$, $\hat{s}(\frac{2}{3})$, $\hat{s}(\frac{4}{3})$ and $\hat{s}(\frac{5}{3})$. These interpolated red component values are then reindexed back to the original column indices of the rectangular grid for reconstruction as discussed above and illustrated in FIG. 7. The three-point segment of the current example is incremented in block 326 to facilitate a one-point overlap, then the horizontal color recovery process of block 306 continues until the column index c equals the total number of columns Q in decision box 328. Of course, the chosen overlap could vary, as could the number of pixels in the segment.

When the column index c equals the total number of columns Q in decision box 328, then the horizontal color recovery has been completed for the red channel and each reconstructed pixel contains either an actual or estimated red color component (see FIG. 8). After completion of horizontal red color recovery, the color channel indicator is incremented in block 308 to color=color+1, and it is determined in block 310 whether all of the primary colors have been processed for horizontal color recovery. The loop of steps 304–310 in FIG. 3A is repeated for each color channel until the process ends in block 312. At that point, the results of the color recovery for each of the red, green and blue channels are combined to provide full color resolution of the output image as shown in FIG. 9.

If an initial grid and pixel layout was selected which required vertical color recovery in block 304 of FIG. 3A, then the process of FIG. 3D would be applied for a column segment size equal to the total number of columns Q of the image. If a segment size smaller than the total number of columns Q was desired, then the process of FIG. 3E would be applied. The steps of the vertical color recovery process of FIG. 3E (described hereinafter) parallel the steps of the horizontal color recovery process previously described for FIG. 3C.

The first step of vertical color recovery for the red channel (assuming a rectangular grid and pixel layout which requires vertical color recovery) is performed by taking a three-point DCT in block 342 of FIG. 3E according to equation (1), where L=N=3, for the first three measured red image data points of row zero located at $s_{rec}(0,0)$, $s_{rec}(3,0)$ and $s_{rec}(6,0)$. In order to evaluate the discrete cosine transformation of equation (1), the three points of the segment should be reindexed to a one-dimensional array as previously described. The DCT coefficients corresponding to $s(0)$, $s(1)$ and $s(2)$ are calculated as $S(0)$, $S(1)$ and $S(2)$ respectively. Next, a three-point modified IDCT according to equation (2) is performed in block 344 on the DCT coefficients $S(0)$, $S(1)$ and $S(2)$ for N=3, yielding interpolated red component values. These interpolated red component values are then reindexed back to the original column indices of the rectangular grid for reconstruction as discussed above. The three-point segment of the current example is incremented in block 346 to facilitate a one-point overlap, then the vertical color recovery process of block 304 continues until the row index r equals the total number of rows P in decision box 348. Of course, the overlap could vary, as could the number of pixels in the segment. When the row index r equals the total number of rows P in decision box 348, then the vertical color recovery has been completed for the red channel and each reconstructed pixel contains either an actual or estimated red color component in the vertical direction.

An alternative and perhaps better approach for color recovery can be implemented by combining the steps of (1) taking a DCT, and (2) taking an IDCT into a single operation (see equation (5)). A combined DCT basis matrix, i.e. a reconstruction matrix MB, can be predetermined for any given segment size. Then, multiplying the reconstruction matrix times the source data for the given range will result in reconstructed image data points in the spatial domain. This method uses fewer calculations than the above described technique, resulting in faster processing. Furthermore, the reconstruction matrix can be used imagewise, so that the amount of memory required to store the reconstruction matrix will be minimal.

A second grid type used to illustrate the inventive DCT color recovery method is a hexagonal grid pixel arrangement as shown in FIG. 10 whereby every other row is offset by one pixel. The two-dimensional input array $s_{hex}(j,i)$ of FIG. 10 contains four rows located at i=0, 1, 2 and 3 and seventeen columns located at j=0, 1, 2 ... 16. Rows located at i=0, 2 have pixels located at columns j=0, 2, 4, 6, 8, 10, 12, 14, and 16 whereas rows located at i=1, 3 have pixels located at columns j=1, 3, 5, 7, 9, 11, 13, and 15. The following example provides color recovery for the hexagonal grid of FIG. 10 according to the method outlined in FIG. 3A.

The aforementioned color recovery method of vertical pixel reconstruction followed by horizontal pixel reconstruction has been empirically shown to provide excellent color recovery results for the hexagonal grid of FIG. 10 by first, implementing vertical color recovery of two-point segments with a one-point overlap and second, implementing horizontal color recovery of three-point segments with a one-point overlap. Hence in block 302 of FIG. 3A L is set equal to three, M is set equal to two, the column index c is set to zero, the row index r is set to zero, and the first color (e.g. red) is selected by setting color=1. Of course, when performing the DCT and modified IDCT for vertical color recovery, N will equal M, and when performing the DCT and modified IDCT for horizontal color recovery N will equal L.

Figure 11:
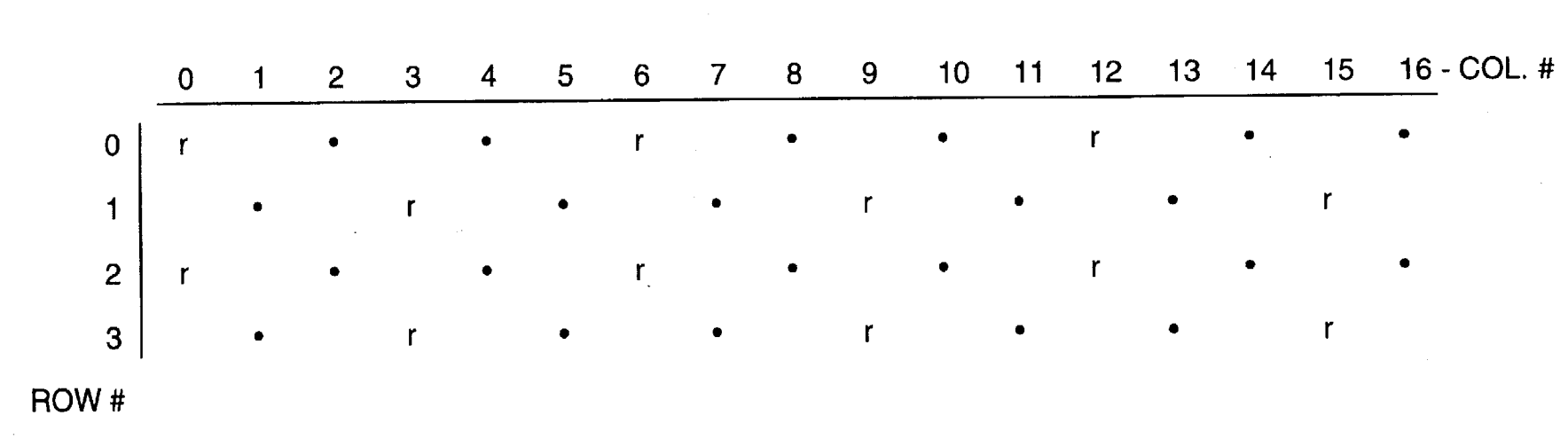

FIG. 11 shows the red channel prior to color recovery. Actual measured red components are present at pixel locations designated by lower case r. All other pixel locations in the red image are devoid of red components, and these missing components can be estimated through interpolation of the actual values using discrete cosine transformations according to the method of the invention.

In FIG. 3E, the first step of vertical color recovery of block 304 for the red channel of the hexagonal grid is performed by taking a two-point DCT in block 342 according to equation (1), where M=N=2, for the first two measured red image data points of column zero located at $s_{hex}(0,0)$ and $s_{hex}(0,2)$ as shown in FIG. 11. In order to evaluate the discrete cosine transformation of equation (1), the two points of the segment should be reindexed to a one-dimensional array so that $s(i)=s_{hex}(j,2i)$ for i=0, 1. Hence, the DCT coefficients corresponding to s(0), s(1) are calculated as S(0), S(1), respectively. In block 344 a two-point modified IDCT according to equation (2) is performed on the DCT coefficients S(0), S(1) for N=2 at x=½, yielding an interpolated vertically reconstructed red component value at ŝ(½). The segment is incremented in block 346 and the vertical color recovery process of block 304 continues until the row index r equals the total number of rows P in decision box 348. The vertically interpolated red component values are then reindexed back to the indices used in the hexagonal grid. The vertical color recovery for the red channel of the image is shown in FIG. 13.

A faster implementation of the above interpolation procedure in the vertical direction can be obtained using the previously mentioned variation of combining the forward DCT of equation (1) and the modified IDCT of equation (2) into a single step. The two-point DCT of s(0) and s(1) according to equation (1) is rewritten in matrix form as:

$$\begin{pmatrix} S(0) \\ S(1) \end{pmatrix} = \begin{pmatrix} \frac{1}{\sqrt{2}} & \frac{1}{\sqrt{2}} \\ \frac{1}{\sqrt{2}} & -\frac{1}{\sqrt{2}} \end{pmatrix} \begin{pmatrix} s(0) \\ s(1) \end{pmatrix} \quad (8)$$

where the constants represent the forward DCT basis matrix. Thereafter, the interpolated red component value of the reconstructed image data point ŝ(½) is determined by performing a modified IDCT of DCT coefficients S(0) and S(1) according to equation (2) at x=½.

The two-point modified IDCT according to equation (2) at x =½ is rewritten in matrix form as:

$$\hat{s}\left(\frac{1}{2}\right) = \left(\frac{1}{\sqrt{2}} \quad 0\right) \begin{pmatrix} S(0) \\ S(1) \end{pmatrix} \quad (9)$$

where ($1/\sqrt{2}0$) represents the modified IDCT basis matrix. The two steps of the forward and modified inverse DCTs can be combined into one step represented in matrix form as shown in equation (5). By substituting equation (8) into equation (9), the interpolated image data point ŝ(½) can be calculated as:

$$\hat{s}\left(\frac{1}{2}\right) = \quad (10)$$

$$\left(\frac{1}{\sqrt{2}} \quad 0\right) \begin{pmatrix} \frac{1}{\sqrt{2}} & \frac{1}{\sqrt{2}} \\ \frac{1}{\sqrt{2}} & -\frac{1}{\sqrt{2}} \end{pmatrix} \begin{pmatrix} s(0) \\ s(1) \end{pmatrix} = \left(\frac{1}{2} \quad \frac{1}{2}\right) \begin{pmatrix} s(0) \\ s(1) \end{pmatrix}$$

In this case, the interpolated red component value is merely the average value of the two adjacent red pixel values which can be efficiently calculated using only one multiplication and one addition.

In the special case of estimating an image perimeter component value (such as the missing red component value at row 0, column 3 in FIG. 10) the missing value can be set to zero or assigned to the same value as an adjacent pixel. In other words, the missing red component value of s(3,0) can be set to the same red component value as s(3,1). This method for estimating perimeter values can be used to complement both vertical and horizontal color recovery.

When the row index r equals the total number of rows P in decision box 348, then the vertical color recovery has been completed for the red channel and each reconstructed pixel as shown in FIG. 13 contains either an actual or estimated red color component. After completion of the vertical red color recovery, the vertically reconstructed pixels of FIG. 13 will be subjected to horizontal color recovery in block 306.

The horizontal color recovery for the red channel of the hexagonal grid is performed in a manner similar to that earlier described for horizontal color recovery of the rectangular grid. The first step of horizontal color recovery for the red channel of the hexagonal grid is performed by taking a three-point DCT in block 322 of FIG. 3C according to equation (1), where L=N=3, for the first three pixels having either actual or estimated red component values and located at s(0,0), s(3,0) and s(6,0) in FIG. 13. Again, in order to evaluate the discrete cosine transformation of equation (1), the three points of the segment should be reindexed to a one-dimensional array. In this case, $s(j)=s_{hex}(3j,i)$ where j=0, 1, 2 so that the array $s_{hex}(3j,i)$ represents the estimated and actual red components of FIG. 13. Similarly, the $i^{th}$ column of the green components will have measured and estimated green components of $s_{hex}(j,i)$ located at $s(j)=s_{hex}(3j+1,i)$, and the $i^{th}$ column of the blue components will have measured and estimated blue components of $s_{hex}(j,i)$ located at $s(j)= s_{hex}(3j+2,i)$. Thus, the DCT coefficients corresponding to $s(0)$, $s(1)$ and $s(2)$ are calculated as $S(0)$, $S(1)$ and $S(2)$, respectively.

Figures 14, 15:
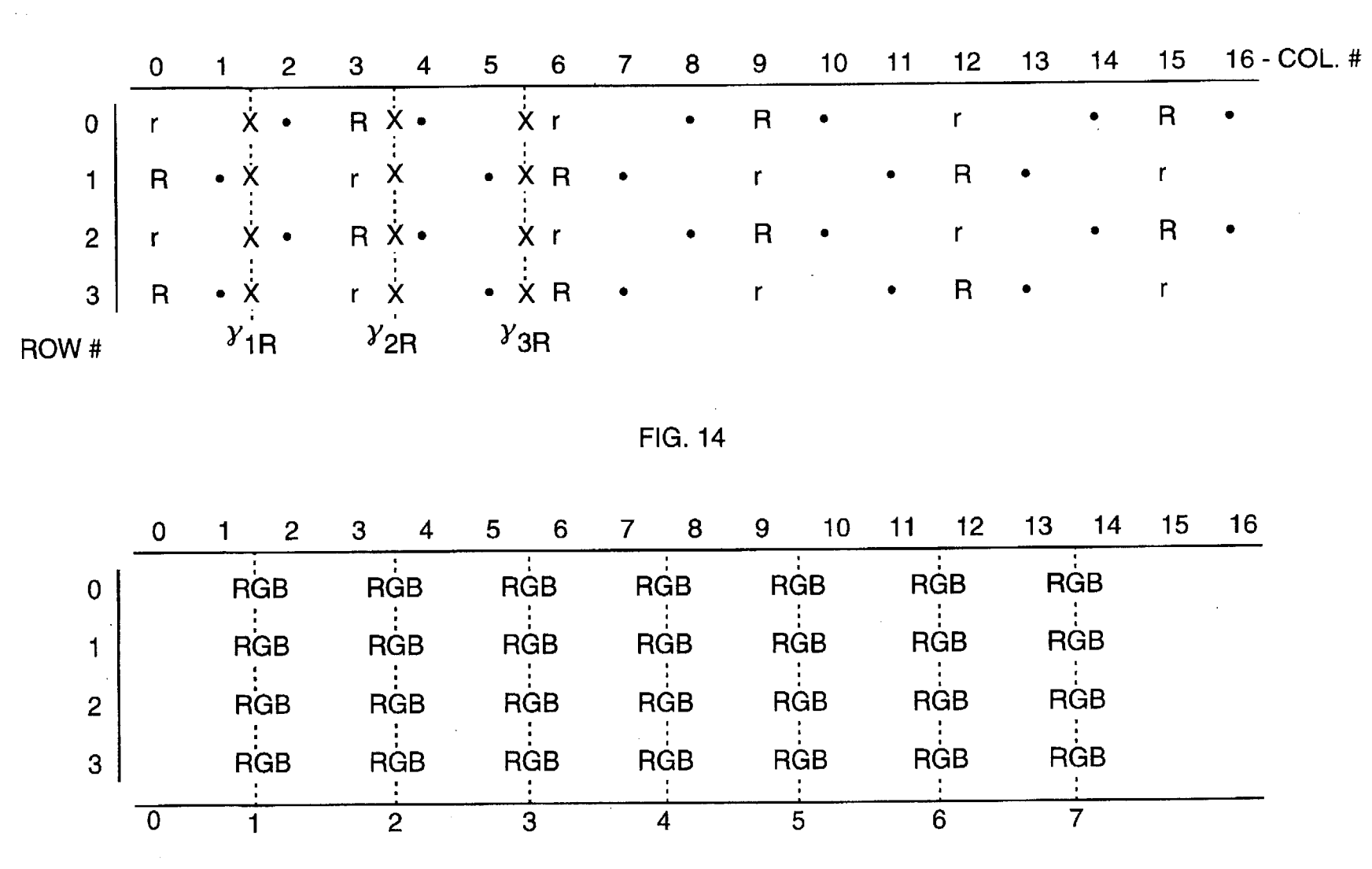

In block 324 a three-point modified IDCT according to equation (2) is performed on the DCT coefficients $S(0)$, $S(1)$ and $S(2)$. Using the continuous interpolation property of the modified IDCT of equation (2), it is possible to find the values of the signal at any location within the range of the input data. Furthermore, it has been determined through experimentation that the creation of pseudo-pixels at locations distinct from actual pixel locations on the grid will provide better color balance and will eliminate artifacts that may arise from having shifted true color values adjacent to interpolated color values. Thus, pseudo-pixels have been selected at locations indicated by cross marks in FIG. 14. The cross marks designate the intersection of rows and columns for three-point segments of pixels (see dotted lines) within the first three columns. It has been determined that excellent color recovery results are obtained when interpolating values of y in the red channel for equation (2) of $\gamma_{1R}=\frac{1}{2}$, $\gamma_{2R}=\frac{7}{6}$ and $\gamma_{3R}=\frac{11}{6}$ as illustrated in FIG. 14. In order for the green and blue pseudo-pixels to be calculated at the same locations marked by the cross marks for the red channel in FIG. 14, the present example requires values to be interpolated within each three-point segments at $\gamma_{1G}=\frac{1}{6}$, $\gamma_{2G}=\frac{5}{6}$ and $\gamma_{3G}=\frac{3}{2}$ for the green channel, and $\gamma_{1B}=\frac{1}{2}$, $\gamma_{2B}=\frac{7}{6}$ and $\gamma_{3B}=\frac{11}{6}$ for the blue channel.

For the purposes of the present discussion concerning horizontal interpolation within the red channel (FIG. 14), the distance between the red pixel centers of column 0 and column 3 is considered one unit length, $\gamma_{1R}$ represents one-half of one unit length, $\gamma_{2R}$ represents seven-sixths of one unit length, and $\gamma_{3R}$ represents eleven-sixths of one unit length. Thus, in block 324 a three-point modified IDCT according to equation (2) is performed on the DCT coefficients $S(0)$, $S(1)$ and $S(2)$ for values $v=0, 1, 2$ at $y=\frac{1}{2}, \frac{7}{6}, \frac{11}{6}$, yielding interpolated horizontally reconstructed red component values, respectively located at $\hat{s}(\frac{1}{2})$, $\hat{s}(\frac{7}{6})$ and $\hat{s}(\frac{11}{6})$. These interpolated red component values are then reindexed to reassigned (integer value) column indices as shown in FIG. 12. A next segment is selected by incrementing the column index c in block 326 to facilitate a one-point overlap, and the horizontal color recovery process of block 306 continues until the column index c equals the total number of columns Q in decision box 328. At that point, both the vertical and horizontal color recovery have been completed for the red channel so that each of the pseudo-pixels located at the cross marks of FIG. 14 contains both estimated vertical and estimated horizontal red color components.

The above vertical color recovery of block 304 and horizontal color recovery of block 306 are repeated for each primary color by incrementing the color indicator in block 308 until full color recovery has occurred. At that point, the color recovery method ends in block 312 and the pseudo-pixels each contain an estimated red component, and estimated green component and an estimated blue component.

A faster implementation of the above interpolation procedure in the horizontal direction can be obtained by combining the forward DCT of equation (1) and the modified IDCT of equation (2) into a single step as described hereinafter. The three-point DCT of $s(0)$, $s(1)$ and $s(2)$ according to equation (1) is rewritten in matrix form as:

$$\begin{pmatrix} S(0) \\ S(1) \\ S(2) \end{pmatrix} = \begin{pmatrix} 0.5774 & 0.5774 & 0.5774 \\ 0.7071 & 0.0000 & -0.7071 \\ 0.4082 & -0.8165 & 0.4082 \end{pmatrix} \begin{pmatrix} s(0) \\ s(1) \\ s(2) \end{pmatrix} \quad (11)$$

where the constants represent the forward DCT basis matrix. Thereafter, the interpolated red component values of the reconstructed image data points $\hat{s}(\gamma_{1R})$, $\hat{s}(\gamma_{2R})$ and $\hat{s}(\gamma_{3R})$ are determined by performing a modified IDCT of DCT coefficients $S(0)$, $S(1)$ and $S(2)$ according to equation (2) for $N=3$ at $y=\frac{1}{2}, \frac{7}{6}, \frac{11}{6}$, rewritten in matrix form as:

$$\begin{pmatrix} \hat{s}(\gamma_{1R}) \\ \hat{s}(\gamma_{2R}) \\ \hat{s}(\gamma_{3R}) \end{pmatrix} = \begin{pmatrix} 0.5774 & 0.4082 & -0.4082 \\ 0.5774 & -0.1418 & -0.7673 \\ 0.5774 & -0.6255 & 0.1418 \end{pmatrix} \begin{pmatrix} S(0) \\ S(1) \\ S(2) \end{pmatrix} \quad (12)$$

where the constants represent the modified IDCT basis matrix.

The two steps of the forward DCT and the modified IDCT can be combined into one step represented in matrix form. By substituting equation (11) into equation (12), the interpolated image data points $\hat{s}(\frac{1}{2})$, $\hat{s}(\frac{7}{6})$ and $\hat{s}(\frac{11}{6})$ can be calculated as:

$$\begin{pmatrix} \hat{s}(\gamma_{1R}) \\ \hat{s}(\gamma_{2R}) \\ \hat{s}(\gamma_{3R}) \end{pmatrix} = \begin{pmatrix} \hat{s}(\frac{1}{2}) \\ \hat{s}(\frac{7}{6}) \\ \hat{s}(\frac{11}{6}) \end{pmatrix} = \begin{pmatrix} 0.4553 & 0.6667 & -0.1220 \\ -0.0802 & 0.9598 & 0.1204 \\ -0.0511 & 0.2176 & 0.8335 \end{pmatrix} \begin{pmatrix} s(0) \\ s(1) \\ s(2) \end{pmatrix} \quad (13)$$

where the constants represent the combined DCT and modified IDCT basis matrix.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

We claim:

1. A color recovery method for use with an input image represented by a grid of pixels each having an actual red, green or blue color component where at least one of the pixels is missing one or more of the actual color components, the color recovery method comprising the steps of:

acquiring an image signal representing the input image;
   generating pseudo-pixels offset from actual pixel locations;
   for each color channel in each dimension, generating DECT coefficients of said image signal corresponding to the related actual color components by taking a discrete even cosine transformation (DECT) of the related actual color components and generating interpolated color components at each said pseudo-pixel by performing a modified IDECT on said DECT coefficients; and
   producing an output image having full color resolution for each said pseudo-pixel by combining said interpolated color components.

2. The color recovery method of claim 1, wherein said pseudo-pixels are reindexed into a rectangular grid pattern.

3. The color recovery method of claim 1 wherein said grid has a hexagonal geometry.

4. A color recovery system for use with an input image represented by a grid of pixels each having an actual red, green or blue color component where at least one of the pixels is missing one or more of the actual color components, the color recovery system comprising:

- means for acquiring an image signal representing the input image;
- means for generating pseudo-pixels offset from actual pixel locations;
- means for generating, for each color channel in each dimension, DECT coefficients of said image signal corresponding to the related actual color components by taking a discrete even cosine transformation (DECT) of the related actual color components and generating interpolated color components at each said pseudo-pixel by performing a modified IDECT on said DECT coefficients; and
- means for producing an output image having full color resolution for each said pseudopixel by combining said interpolated color components.

5. The color recovery system of claim 4, wherein said pseudo-pixels are reindexed into a rectangular grid pattern.

6. The color recovery system of claim 4 wherein said grid has a hexagonal geometry.

* * * * *